United States Patent
Panje

(10) Patent No.: US 10,778,524 B2
(45) Date of Patent: Sep. 15, 2020

(54) METHOD AND SYSTEM OF IN HOME WI-FI ACCESS POINT REPLICATION

(71) Applicant: ARRIS Enterprises LLC, Suwanee, GA (US)

(72) Inventor: Krishna Prasad Panje, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 179 days.

(21) Appl. No.: 15/830,986

(22) Filed: Dec. 4, 2017

(65) Prior Publication Data

US 2019/0173756 A1 Jun. 6, 2019

(51) Int. Cl.
| | |
|---|---|
| *G06F 15/177* | (2006.01) |
| *H04L 12/24* | (2006.01) |
| *H04W 12/06* | (2009.01) |
| *H04W 12/00* | (2009.01) |
| *H04W 88/08* | (2009.01) |
| *H04W 84/12* | (2009.01) |

(52) U.S. Cl.
CPC ...... *H04L 41/0846* (2013.01); *H04L 41/0883* (2013.01); *H04L 41/22* (2013.01); *H04W 12/003* (2019.01); *H04W 12/06* (2013.01); *H04W 84/12* (2013.01); *H04W 88/08* (2013.01)

(58) Field of Classification Search
USPC ............... 370/328, 338, 352; 726/25; 713/1; 455/418
See application file for complete search history.

(56) References Cited

U.S. PATENT DOCUMENTS

| | | | | |
|---|---|---|---|---|
| 7,457,262 B1* | 11/2008 | Doshi | ............... | H04W 24/04 370/328 |
| 2006/0039360 A1* | 2/2006 | Thawani | ............. | H04W 8/20 370/352 |
| 2009/0119776 A1* | 5/2009 | Palnitkar | ............ | G06Q 20/10 726/25 |
| 2009/0215438 A1* | 8/2009 | Mittal | ........... | H04M 3/42195 455/418 |
| 2013/0115945 A1 | 5/2013 | Holostov et al. | | |
| 2013/0223424 A1* | 8/2013 | Jiang | ................. | H04W 48/20 370/338 |

(Continued)

FOREIGN PATENT DOCUMENTS

JP 2015-119313 A 6/2015

OTHER PUBLICATIONS

PCT International Search Report & Written Opinion, Re: Application No. PCT/US2018/063939, dated Feb. 13, 2019.

*Primary Examiner* — Quang N Nguyen
(74) *Attorney, Agent, or Firm* — Wenderoth, Lind & Ponack, L.L.P.

(57) ABSTRACT

A method for replication of an access point includes: establishing, by a computing device, a first communication channel with a first access point of an area network; receiving, by a receiver of the computing device, configuration data from the first access point using the first communication channel, wherein the configuration data includes at least a network identifier and password associated with the area network; establishing, by the computing device, a second communication channel with a second access point; and electronically transmitting, by a transmitter of the computing device, the configuration data to the second access point using the second communication channel.

17 Claims, 4 Drawing Sheets

(56) References Cited

U.S. PATENT DOCUMENTS

| | | | |
|---|---|---|---|
| 2013/0254519 A1* | 9/2013 | Benoit | H04W 12/04 |
| | | | 713/1 |
| 2014/0003290 A1 | 1/2014 | Ruiz et al. | |
| 2015/0063331 A1 | 3/2015 | Scahill et al. | |
| 2015/0271745 A1 | 9/2015 | Knowles | |
| 2016/0054962 A1* | 2/2016 | Park | H04L 41/0806 |
| | | | 358/1.15 |
| 2017/0347388 A1* | 11/2017 | Cai | H04W 12/06 |
| 2017/0359774 A1* | 12/2017 | Lu | H04W 48/16 |
| 2018/0191572 A1* | 7/2018 | Ben-Haim | H04L 41/0893 |
| 2018/0287672 A1* | 10/2018 | Kaushik | H04B 7/0452 |
| 2018/0331828 A1* | 11/2018 | Pakkan | H04W 12/04 |
| 2018/0332586 A1* | 11/2018 | Takeuchi | H04W 76/10 |
| 2019/0058996 A1* | 2/2019 | Frei | H04W 12/04 |

\* cited by examiner

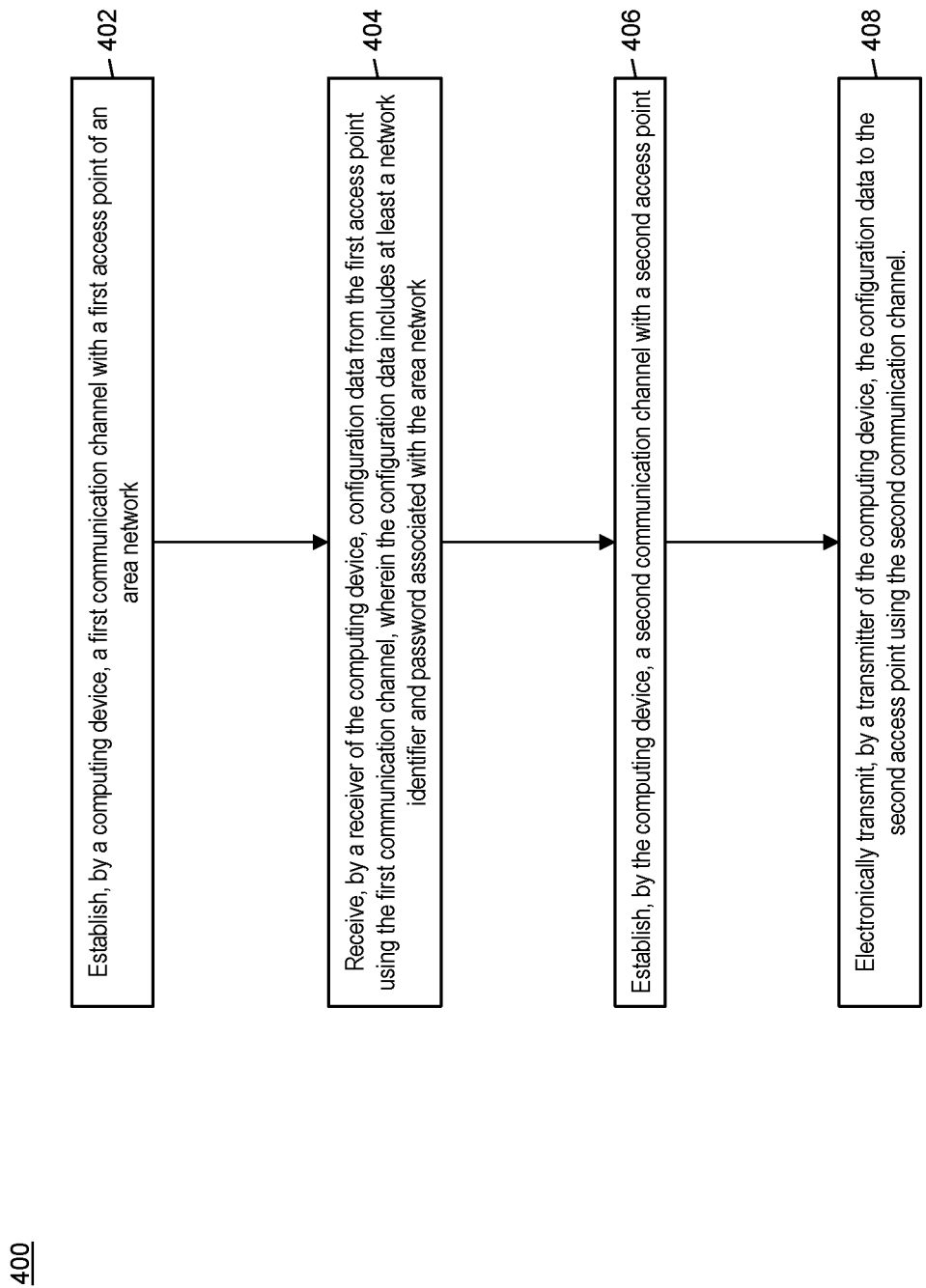

METHOD AND SYSTEM OF IN HOME WI-FI ACCESS POINT REPLICATION

FIELD

The present disclosure relates to the replication of an access point in an area network, specifically the use of a separate computing device that utilizes alternative communication channels to copy configuration data from one access point to another to simplify replication or extension of an access point.

BACKGROUND

Access points and gateways are used to facilitate the connection between devices on a local network and a wider network, most commonly the Internet. Access points can be found in many homes, often in the form of a router, and in nearly every business, where access points enable devices to gain access to the Internet thereby, often including both permanent or semi-permanent local devices as well as guest devices, such as customers of a business that are provided free or per-subscription wireless Internet access.

Home or business owners that use access points sometimes find themselves in need of a new or additional access point. For instance, the entity may have a desire to upgrade the speed or configuration of their local network, connect to a different type of external network, or add in a type of access point referred to as an "extender," which will add an additional access point to their local network to help strengthen or widen the range of the network or strengthen is signal(s) that will enable local devices to connect through to the Internet. In these cases, the home or business owner will usually have to access their current access point's configuration, often following an authentication process, and make a note of all of the configuration options they currently utilize, which, in many cases, can be a significant number of options. Then, the home or business owner must access the configuration of their new access point, often through a separate authentication process, and manually replicate each of the configuration options. This may be a time consuming and difficult process, particularly for networks where a large number of access points may need to be replicated, or for home owners that may be inexperienced with configuration of access points.

Some access points have been developed that are able to copy configuration data from a local network of which it is a member. However, such access points must first gain access to the local network to be able to copy the configuration data. In these cases, partial configuration data, most notably the network identifier (e.g., the "service set identifier" or "SSID"), password, and security type, must first be supplied to the access point to enable it to connect the local network, after which it may be able to detect and copy other configuration data.

In such cases, an inexperienced home owner may be able to copy a complex configuration to their new access point, but still must first manually configure the connection of their new access point, which may still be a time consuming process involving the user connecting the access point to a computing device, authenticating with the access point, providing the configuration data, ensuring the access point can connect to the local area network, initiating the copy of the configuration data, and then installing the access point in its proper location, which is often in a different location than the computing device that is being used to initialize the access point. For business owners that may be installing or replicating a significant number of access points, this time consuming process is compounded. Thus, there is a need for a technical solution whereby an access point in a local network may be replicated with minimal interaction and impact on the user.

SUMMARY

The present disclosure provides a description of systems and methods for replication of access points. A separate computing device, such as a smart phone or other suitable type of device, is used to establish a communication channel with an access point being replicated, such as via Bluetooth. The computing device copies the configuration data from the access point, and then connects to a new access point via another communication channel. The computing device then provides the copied configuration data to the new access point via this channel, which completes the replication process. The use of the alternative communication channels outside of the local network ensures that the new access point does not need any basic configuration data prior to the process, resulting in the replication being performed in a minimal number of steps: the user needs to only select each access point on the computing device and replication can be completed. In addition, the use of a separate device with a separate interface for the replication may provide the user with simplified commands in terms of selecting the configuration data to be replicated, which may provide greater convenience and ease of use for users.

A method for replication of an access point includes: establishing, by a computing device, a first communication channel with a first access point of an area network; receiving, by a receiver of the computing device, configuration data from the first access point using the first communication channel, wherein the configuration data includes at least a network identifier and password associated with the area network; establishing, by the computing device, a second communication channel with a second access point; and electronically transmitting, by a transmitter of the computing device, the configuration data to the second access point using the second communication channel.

A system for replication of an access point includes: a transmitter of a computing device; a communications interface of the computing device configured to establish a first communication channel with a first access point of an area network; and a receiver of the computing device configured to receive configuration data from the first access point using the first communication channel, wherein the configuration data includes at least a network identifier and password associated with the area network, wherein the communications interface of the computing device is further configured to establish a second communication channel with a second access point, and the transmitter of the computing device is configured to electronically transmit the configuration data to the second access point using the second communication channel.

A non-transitory computer readable media has instructions operable to cause one or more processors to perform the operations including: establishing, by a computing device, a first communication channel with a first access point of an area network; receiving, by a receiver of the computing device, configuration data from the first access point using the first communication channel, wherein the configuration data includes at least a network identifier and password associated with the area network; establishing, by the computing device, a second communication channel with a second access point; and electronically transmitting, by a transmitter of the computing device, the configuration data to the second access point using the second communication channel.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIG. 4 is a flow chart illustrating an exemplary method for replication of an access point in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Replicating an Access Point in an Area Network

Figure 1:
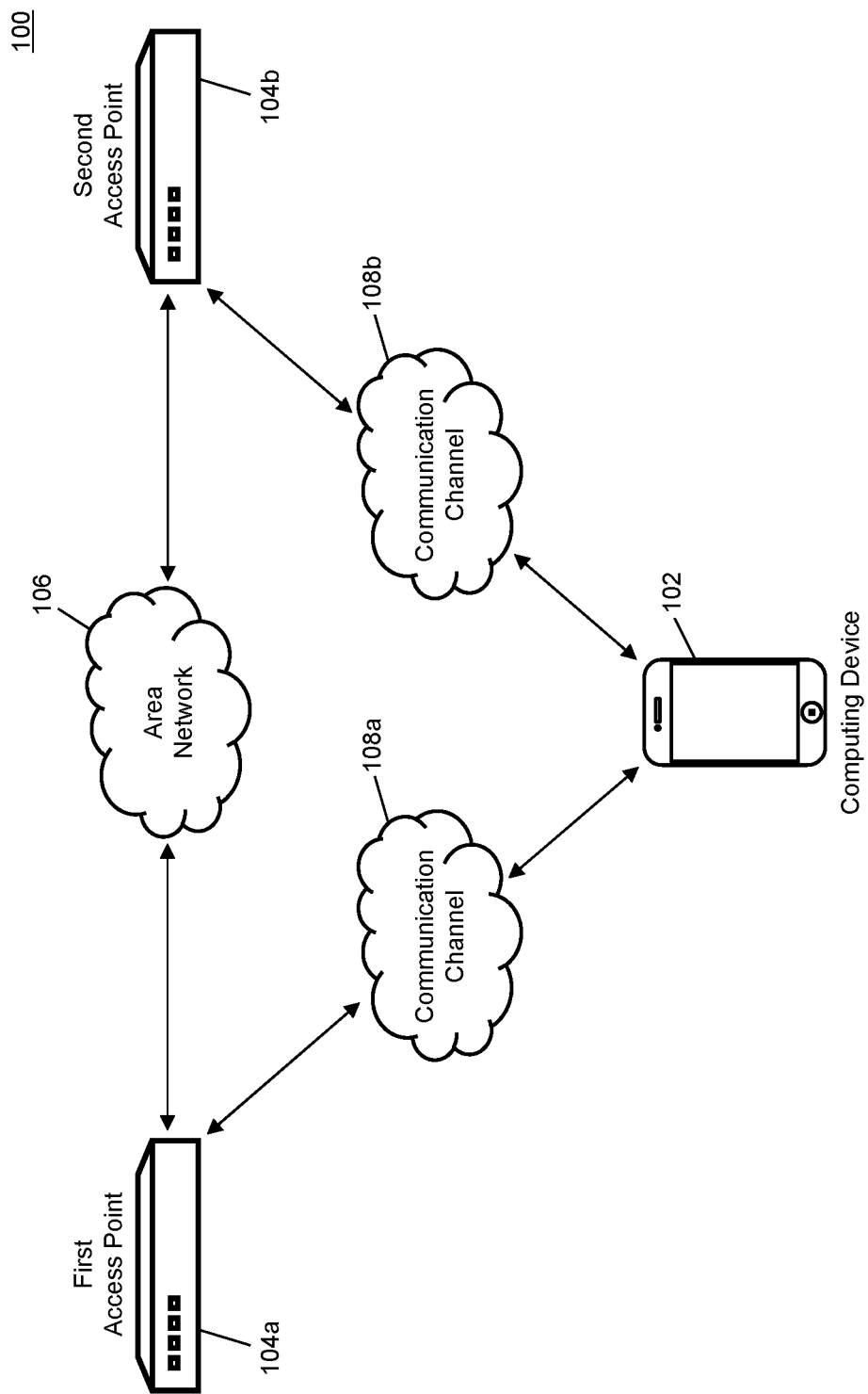
FIG. 1 is a block diagram illustrating a high level system architecture for replicating an access point in an area network in accordance with exemplary embodiments.

FIG. 1 illustrates a system 100 for the replication of an access point to a local network via the use of a computing device 102 configured to connect to access points using a communication channel separate from the local network for use in replicating configuration data of a first access point.

The system 100 may include the computing device 102. The computing device 102, discussed in more detail below, may be configured to communicate with access points 104 of an area network 106 and replicate the configuration data of a first access point 104a to a second access point 104b. The computing device 102 may be any type of computing device that has been specifically configured to perform the functions discussed herein, such as a specially configured cellular phone, smart phone, smart watch, wearable computing device, implantable computing device, smart television, desktop computer, laptop computer, notebook computer, tablet computer, etc. In the system 100, a first access point 104a may be configured to operate or otherwise be in connection with the area network 106. The area network 106 may utilize any suitable type of connection and protocol for operation of a communication network whereby additional devices may be able to connect to the area network 106. In some cases, the first access point 104a may provide access to an external network, such as the Internet, for any devices connected thereto via the area network 106. The area network 106 may be, for instance a local area wireless network utilizing an IEEE 802.11 specification.

A user of the area network 106 may be interested in replicating the configuration of the first access point 104a to a second access point 104b. The second access point 104b may be, for instance, a new access point intended as a replacement to the first access point 104a or an extender used to extend the range and/or strength of the signal of the area network 106 for use by devices intended to connect thereto. To replicate the configuration of the first access point 104a, the computing device 102 may establish a communication channel 108 with the first access point 104a, illustrated in FIG. 1 as communication channel 108a and a second communication channel with access point 104b on a communication channel 108b. In an exemplary embodiment, the communication channel 108a may utilize a different communication network and protocol than the area network 106 and 108b. For instance, the area network 106 and 108a may be a wireless area network utilizing the IEEE 802.11 specification, while the communication channel 108b may utilize Bluetooth, Bluetooth Low Energy, near field communication, radio frequency, infrared, or other suitable type of communication. In one embodiment, the communication channel 108b may utilize a unique Bluetooth service.

The computing device 102 may establish the communication channel 108a with the first access point 104a, after which the first access point 104a may provide its configuration data to the computing device 102 utilizing the communication channel 108a. In some embodiments, the first access point 104a may require authentication prior to replication of its configuration data. In such embodiments, the computing device 102 may be interfaced with an input device through which a user of the computing device 102 may input authentication data (e.g., a username and password), which may be forwarded to the first access point 104a via the communication channel 108a. In these embodiments, the first access point 104a may authenticate the user as authorized to replicate the configuration data via the supplied authentication data prior to forwarding the configuration data to the computing device 102. In such embodiments, the computing device 102 may have previously established a connection with the access point 104a and correspondingly possessed configuration information of the access point 104a.

In some instances, the first access point 104a may provide all configuration data of the first access point 104a to the computing device 102. In other instances, the configuration data that is replicated may be manually selected, such as by a user of the computing device 102 via the computing device 102. For instance, the computing device 102 may present an interface to the user thereof to select which configuration options are to be replicated via the process discussed herein. The user may select what configuration options to replicate using the input device interfaced with the computing device 102. In some such instances, the computing device 102 may provide these selections to the first access point 104a when requesting the configuration data for replication. In other such instances, the first access point 104a may provide its entire configuration data for replication, where the computing device 102 may filter out any configuration data not related to the selected configuration options.

After the computing device 102 has received the configuration data from the first access point 104a, it may replicate the first access point 104a by providing the configuration data to the second access point 104b. The computing device 102 may establish a separate communication channel 108, illustrated in FIG. 1 as communication channel 108b, with the second access point 104b. In some embodiments, the communication channel 108a and communication channel 108b may utilize the same communication protocol (e.g., Bluetooth), but be maintained as separate communication channels directly between the computing device 102 and the respective access point 104. In other embodiments, the communication channel 108b may utilize a different communication protocol from the communication channel 108a, but may still be separate and distinct from the area network 106's communication method and protocol. In some cases, the computing device 102 may establish the communication channel 108b with the second access point 104b after receipt of the configuration data from the first access point 104a. In other cases, the communication channel 108b may be established prior to receipt of the configuration data or prior to the establishing of the communication channel 108a with the first access point 104a.

The computing device 102 may provide the configuration data to the second access point 104b via the communication channel 108b, where the second access point 104b may then reconfigure the second access point 104b based on the configuration data to implement the same configuration therein. In cases where the user selected which configuration options to replicate, the configuration data provided to the second access point 104b may include only those options. In some embodiments, the second access point 104b may require authentication prior to receipt and/or implementation of configuration options. In such embodiments, the computing device 102 may receive authentication data (e.g., a username and password) from a user via an input device interfaced therewith, which may be provided to the second access point 104b via the communication channel 108b. The second access point 104b may then authenticate the user via the data and, if authentication is successful, accept the configuration data and implement the corresponding configuration therein. Following implementation of the configuration data, the second access point 104b may be a replicate of the first access point 104a, such as for replacement of the first access point 104a or extension of the area network 106.

In some embodiments, the second access point 104b may be configured to receive some configuration data directly from the first access point 104a, such as through the area network 106. In such embodiments, the computing device 102 may receive configuration data from the first access point 104a that is suitable for establishing and maintaining connection to the area network 106, such as an SSID and password. The computing device 102 may provide these configuration options to the second access point 104b via the communication channel 108b. The second access point 104b may implement the configuration options to establish a connection to the area network 106, and then request the remainder of the configuration data directly from the first access point 104a.

In some embodiments, the replication of the first access point 104a as the second access point 104b may also include the opposite, where the first access point 104a may be replicated using the configuration of the second access point 104, effectively resulting in a swap of the configurations of the access points 104. In such embodiments, the computing device 102 may establish the communication channels 108 with each access point 104 and receive the configuration data from each access point 104 prior to distributing the configuration data to either access point 104. Once the configuration data from each has been received, the computing device 102 may transmit the configuration data from each access point 104 to the other access point 104, effectively swapping the configurations.

The methods and systems discussed herein may enable an access point to be replicated via the use of an external computing device 102 that minimizes the time and effort that must be expended by a user thereof. It also provides a technical solution by enabling computationally efficient, fast and reliable configuration of the access point. By using separate communication channels 108 from the area network 106 and the use of the computing device 102, an access point 104 may be replicated through as little as two selections by the user, the selection of the first access point 104a being replicated, and selection of the second access point 104b that is to be configured accordingly. The use of the computing device 102 may also provide the user with greater freedom in the selection of configuration options that are to be replicated, as they may be presented directly to the user for easy selection without requiring the user to manually connect to the first access point 104a and identify and copy each configuration option directly. In addition, if the computing device 102 uses a wireless protocol for the communication channels 108, the first access point 104a and second access point 104b may be accessed via the methods discussed herein without moving either access point 104, resulting in faster and easier installation and/or replacement of the access points 104.

Computing Device

Figure 2:
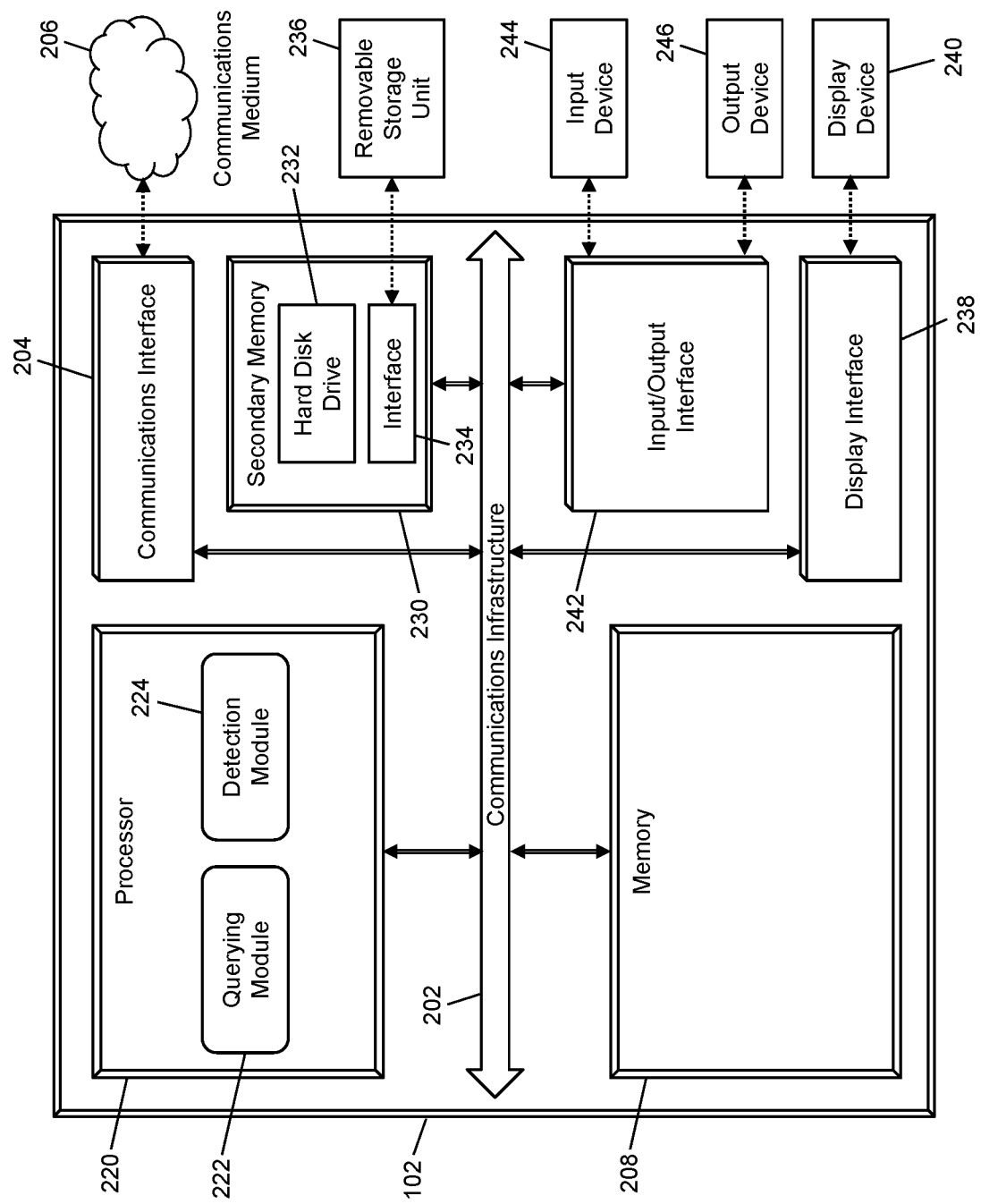
FIG. 2 is a block diagram illustrating the computing device of the system of FIG. 1 for replicating an access point in an area network in accordance with exemplary embodiments.

FIG. 2 illustrates an embodiment of the computing device 102 in the system 100. It will be apparent to persons having skill in the relevant art that the embodiment of the computing device 102 illustrated in FIG. 2 is provided as illustration only and may not be exhaustive to all possible configurations of the computing device 102 suitable for performing the functions as discussed herein.

The computing device 102 may include a communications infrastructure 202. The communications infrastructure 202 may be configured to transmit data between modules, engines, databases, memories, and other components of the computing device 102 for use in performing the functions discussed herein. The communications infrastructure 202 may be comprised of one or more communication types and utilize various communication methods for communications within a computing device. For example, the communications infrastructure 202 may be comprised of a bus, contact pin connectors, wires, etc. In some embodiments, the communications infrastructure 202 may also be configured to communicate between internal components of the computing device 102 and external components of the computing device 102, such as externally connected databases, display devices, input devices, etc.

The computing device 102 may also include a communications interface 204. The communications interface 204 may include one or more interfaces used to interact with and facilitate communications between the computing device 102 and one or more external devices via suitable communications mediums 206. For instance, the communications interface 204 may interface with the communications infrastructure 202 and provide an interface 204 for connecting the computing device 102 to one or more communications mediums 204 for the electronic transmission or receipt of data signals that are encoded or otherwise superimposed with data for use in performing the functions discussed herein. Communications interfaces 204 may include universal serial bus (USB) ports, Personal Computer Memory Card International Association (PCMCIA) ports, PS/2 ports, serial ports, fiber optic ports, coaxial ports, twisted-pair cable ports, wireless receivers, etc. Communications mediums 206 may include local area networks, wireless area networks, cellular communication networks, the Internet, radio frequency, Bluetooth, near field communication, etc.

In some instances, the computing device 102 may include multiple communications interfaces 204 for electronically transmitting and receiving data signals via one or more communications mediums 206, such as a first communications interface 204 configured to transmit and receive data signals via a local area network and a second communications interface 204 configured to transmit and receive data signals via the Internet. In some instances, the communications interface 204 may include a parsing module for parsing received data signals to obtain the data superimposed or otherwise encoded thereon. For example, the communications interface 204 may include (e.g., or otherwise have access to, such as via the communications infrastructure 204) a parser program configured to receive and transform the received data signal into usable input for the functions performed by the processing device to carry out the methods and systems described herein.

The communications interface 204 may be configured to establish communication channels 108 with access points 104, such as the communication channel 108*a* with the first access point 104*a* and the communication channel 108*b* with the first access point 104*b*. The communications interface 204 may include a receiver configured to receive data signals electronically transmitted by access points 104, such as may be superimposed or otherwise encoded with configuration data. The communications interface 204 may also include a transmitter, which may be configured to electronically transmit data signals to access points 104, such as may be superimposed or otherwise encoded with configuration data and/or authentication data.

The computing device 102 may also include a memory 208. The memory 208 may be configured to store data for use by the computing device 102 in perform the functions discussed herein. The memory 208 may be comprised of one or more types of memory using one or more suitable types of memory storage, such as random access memory, read-only memory, hard disk drives, solid state drives, magnetic tape storage, etc. In some cases, the memory 208 may be non-transitory computer readable media, which may be configured to store data suitable for execution by the computing device 102 in performing the functions discussed herein. The memory 208 may store data in any suitable type of configuration, such as in one or more lists, databases, tables, etc., which may store the data in a suitable data format and schema. In some instances, the memory 208 may include one or more relational databases, which may utilize structured query language for the storage, identification, modifying, updating, accessing, etc. of structured data sets stored therein.

The memory 208 of the computing device 102 may be configured to store, for instance, data used in the establishing of communication channels 108 with access points 104. The memory 208 may also be configure to store program code associated with an application program that may be executed by the computing device 102, such as to provide an interface to a user thereof for use in selecting access points 104 for replication, inputting authentication data, selecting configuration options to be replicated, and other functions as discussed herein. The memory 208 may also be configured to store configuration data, such as may be received from the first access point 104*a*, for later transmission, such as to the second access point 104*b* as part of the replication process.

The computing device 102 may also include a processor 220. The processor 220 may be configured to perform the functions of the computing device 102 discussed herein as will be apparent to persons having skill in the relevant art. In some embodiments, the processor 220 may include and/or be comprised of a plurality of engines and/or modules specially configured to perform one or more functions of the processing device, such as a querying module 222, detection module 224, etc. As used herein, the term "module" may be software or hardware particularly programmed to receive an input, perform one or more processes using the input, and provides an output. The input, output, and processes performed by various modules will be apparent to one skilled in the art based upon the present disclosure. The processor 220 as discussed herein may be a single processor, a plurality of processors, or combinations thereof, which may also include processors that may have one or more processor "cores." Operations performed by the processor 220 or modules included therein may be performed as a sequential process and/or be performed in parallel, concurrently, and/or in a distributed environment. In some embodiments the order of operations may be rearranged without departing from the spirit of the disclosed subject matter. The processor 220 and the modules or engines included therein may be configured to execute program code or programmable logic to perform the functions discussed herein, such as may be stored in the memory 208 and/or a secondary memory 230, discussed in more detail below.

The processor 220 of the computing device 102 may include a querying module 222. The querying module 222 may be configured to execute queries on databases to identify information. The querying module 222 may receive one or more data values or query strings, and may execute a query string based thereon on an indicated database, such as the memory 208, to identify information stored therein. The querying module 222 may then output the identified information to an appropriate engine or module of the computing device 102 as necessary. The querying module 222 may, for example, execute a query on the memory 208 to identify configuration data previously received from a first access point 104*a* and stored therein, for use in distribution to a second access point 104*b* as part of the replication process.

The processor 220 of the computing device 102 may also include a detection module 224. The detection module 224 may be configured to detect access points 104 for use in the establishing of a communication channel 108 therewith. The detection module 224 may be configured to detect signals that may be emitted by access points 104 that may be associated with a communication protocol that may be utilized in the establishing of a communication channel 108 with that access point 104, such as a Bluetooth signal that may be emitted by each access point 104. In some cases, the computing device 102 may be configured to present a list of detected access points 104 to the user, for selection by the user as the first access point 104*a* and second access point 104*b* to be used in a replication process.

In some embodiments, the computing device 102 may also include a secondary memory 230. The secondary memory 230 may be another memory in addition to the memory 208 that may be used to store additional data for use in performing the functions of the computing device 102 as discussed herein. In some embodiments, the secondary memory 230 may be a different format or may use a different data storage method and/or schema than the memory 208. The secondary memory 230 may be any suitable type of memory, and, in some instances, may include multiple types of memory. For instance, the secondary memory 230 may be comprised of a hard disk drive 232 and one or more interfaces 234, where the interfaces 234 are configured to transmit data to and receive data from one or more removable storage units 236. Removable storage units 236 may include, for example, floppy disks, compact discs, digital video discs, Blu-ray discs, removable hard drives, flash drives, universal serial bus drives, etc.

In some cases, the computing device 102 may also include a display interface 238. The display interface may be configured to interface the computing device 102 with one or more display devices 240. The display devices 240 may be devices configure to display data received from the computing device 102. Display devices 240 may be any suitable type of display, including, for example, liquid crystal displays, light emitting diode displays, thin film transistor display, capacitive touch displays, etc. In some instances, the computing device 102 may include one or more display interfaces 238, which may interface with one or more display devices 240. Display devices 240 may, for example, display menus for the selection of access points 104 for replication to/from, the selection of configuration options to be replicated, the input of authentication data for authentication with an access point, etc.

The computing device 102 may also include an input/output interface 242. The input/output interface 242 may be configured to interface the computing device 102 with one or more input devices 244 and/or output devices 246 for the transmission to and receipt of data from the respective devices. The input/output interface 242 may include any suitable type of interface, and in some instances may include multiple types of interfaces, such as for interfacing with multiple types of input devices 244 and/or output devices 246. Input devices 244 may include any suitable type of device for inputting data to an computing device 102, such as a keyboard, mouse, microphone, camera, touch screen, click wheel, scroll wheel, remote control, etc. Input devices 244 may be configured to receive input from a user of the computing device 102, such as for the selection of configuration options, supplying of authentication data, etc. Output devices 246 may include any suitable type of device for outputting data from an computing device 102, such as a speaker, remote control, headset, tactile feedback device, etc.

Process for Replication of an Access Point in an Area Network

Figure 3:
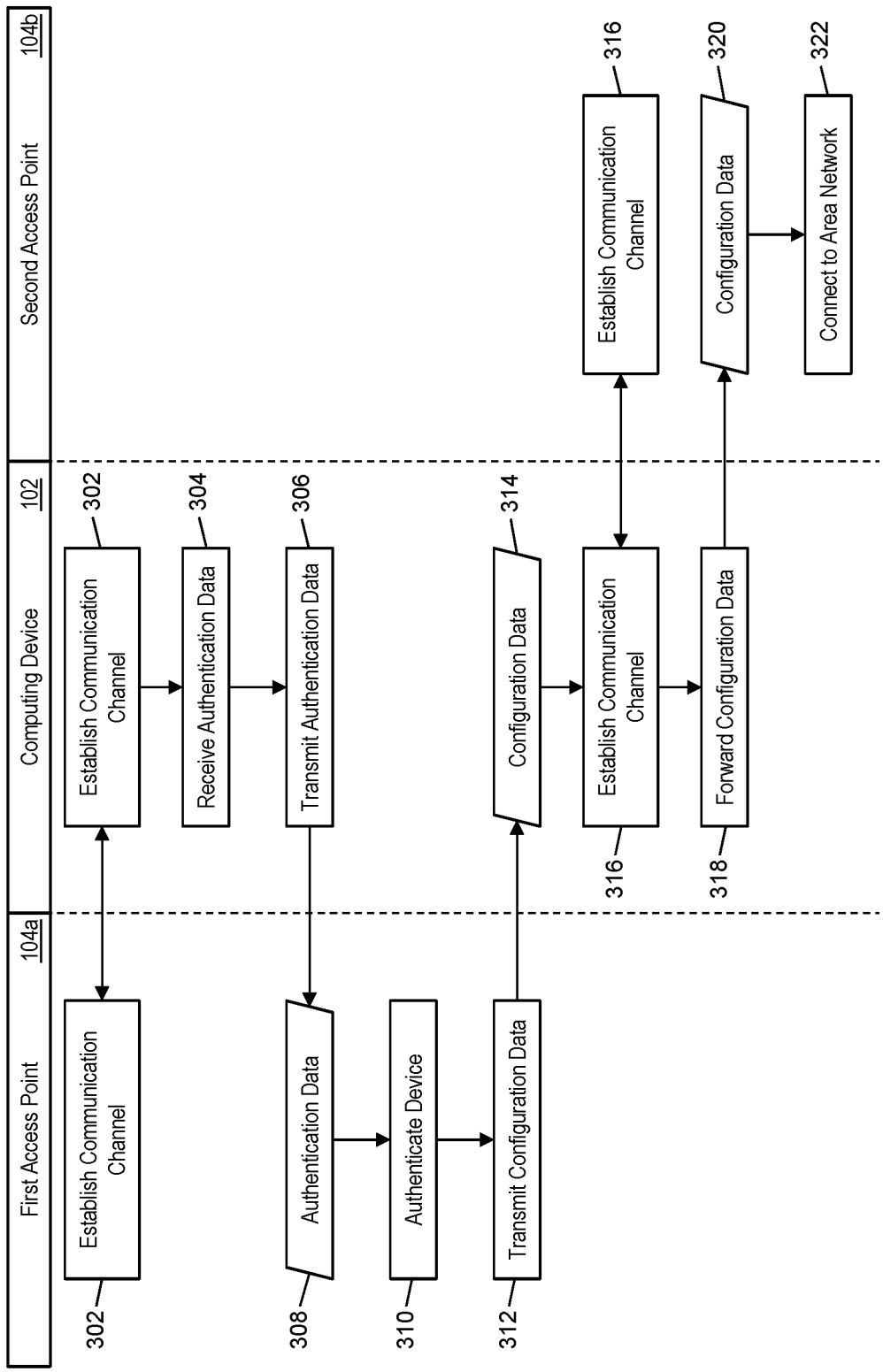
FIG. 3 is a flow diagram illustrating a process for the replication of an access point in an area network in the system of FIG. 1 in accordance with exemplary embodiments.

FIG. 3 illustrates an example process in the system 100 for the replication of a first access point 104a in an area network 106 as a second access point 104b via use of the computing device 102.

In step 302, the computing device 102 may establish a communication channel 108a with the first access point 104a via the communications interface 204 of the computing device 102. In an exemplary embodiment, the communication channel 108a may be separate and distinct from an area network 106 associated with the first access point 104a and may utilize a different communication protocol and/or method. In step 304, the computing device 102 may receive, via an input device 244 interfaced therewith, authentication data as supplied by a user thereof. The authentication data may include a username, password, biometric data, personal identification number, or any other type of data that may be suitable for use in authentication. In step 306, a transmitter of the communications interface 204 of the computing device 102 may electronically transmit the authentication data to the first access point 104a as part of a request for replication thereof.

In step 308, the first access point 104a may receive the authentication data, which may be transmitted via the communication channel 108a. In step 310, the first access point 104a may authenticate the computing device 102 as being authorized to replicate the access point 104a, based on the authentication data supplied by the computing device 102. Upon successful authentication, in step 312, the first access point 104a may electronically transmit configuration data associated with the first access point's configuration with the area network 106 to the computing device 102 via the communication channel 108a. In some cases, the computing device 102 may have previously established a connection with the access point 104a and received configuration data therefrom. In step 314, a receiver of the computing device's communications interface 204 may receive the configuration data from the first access point 104a. In some embodiment, the configuration data may only include specified configuration options, such as may have been indicated in the request submitted in step 306, such as further based on instructions supplied by a user of the computing device 102, such as in step 304.

In step 316, the communications interface 204 of the computing device 102 may establish a communication channel 108b between the computing device 102 and the second access point 104b. In an exemplary embodiment, the communication channel 108b may be separate and distinct from the communication channel 108a, and may use a different communication protocol than utilized by the area network 106. In step 318, the transmitter of the communications interface 204 of the computing device 102 may electronically transmit the configuration data received from the first access point 104a to the second access point 104b using the established communication channel 108b. In step 320, the second access point 104b may receive the configuration data. In some embodiments, the second access point 104b may require authentication of the computing device 102. In such embodiments, the configuration data may be accompanied by authentication data, such as may be supplied by a user of the computing device 102 via the input device 244 interfaced therewith prior to step 318. Once the second access point 104b has received the configuration data (e.g., and authenticated the computing device 102, if necessary), the second access point 104b may implement the configuration corresponding to the configuration data. In step 322, the second access point 104b may connect to the area network 106 using the new configuration data.

Exemplary Method for Replication of an Access Point

FIG. 4 illustrates an exemplary method 400 for the replication of an access point in an area network via the use of an external computing device and separate communication channels.

In step 402, a first communication channel (e.g., the communication channel 108a) may be established by a computing device (e.g., the computing device 102) with a first access point (e.g., the first access point 104a) of an area network (e.g., the area network 106). In step 404, configuration data may be received from the first access point by a receiver of the computing device using the first communication channel, wherein the configuration data includes at least a network identifier and password associated with the area network.

In step 406, a second communication channel (e.g., the communication channel 108b) may be established by the computing device with a second access point (e.g., the second access point 104b). In step 408, the configuration data may be electronically transmitted to the second access point by a transmitter of the computing device using the second communication channel.

In one embodiment, the first communication channel and the second communication channel may use a different communication protocol from the area network. In some embodiments, the method 400 may further include: detecting, by the computing device (e.g., the detection module 224 thereof), a plurality of access points including the first access point and the second access point; displaying, on a display device (e.g., the display device 240) interfaced with the computing device, a list of the plurality of access points; and receiving, by an input device (e.g., the input device 244) interfaced with the computing device, a selection of the first access point and a selection of the second access point. In one embodiment, the method 400 may also include: displaying, by a display device interfaced with the computing device, a list of configuration options; and receiving, by an input device interfaced with the computing device, a selection of one or more configuration options, wherein the configuration data received from the first access point includes configuration options corresponding to the received selection of one or more configuration options.

In some embodiments, the method 400 may further include: receiving, by an input device interfaced with the computing device, authentication data including at least a username and an associated password; and electronically transmitting, by the transmitter of the computing device, the authentication data to the first access point using the first communication channel, wherein the authentication data is transmitted to the first access point prior to receiving the configuration data from the first access point. In one embodiment, the method 400 may also include: receiving, by the receiver of the computing device, alternative configuration data from the second access point using the second communication channel, wherein the alternative configuration data includes at least a network identifier and password associated with a second network; and electronically transmitting, by the transmitter of the computing device, the alternative configuration data to the first access point using the first communication channel. In some embodiments, the second access point may be configured to join the area network using the transmitted configuration data and received additional configuration data from the first access point using the area network.

Techniques consistent with the present disclosure provide, among other features, systems and methods for replication of access points. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for replication of an access point, comprising:
   establishing, by a computing device, a first communication channel with a first access point of an area network;
   receiving, by a receiver of the computing device, configuration data from the first access point using the first communication channel, wherein the configuration data includes at least a network identifier and password associated with the area network;
   establishing, by the computing device, a second communication channel with a second access point;
   electronically transmitting, by a transmitter of the computing device, the configuration data to the second access point using the second communication channel;
   receiving, by an input device interfaced with the computing device, authentication data including at least a username and an associated password; and
   electronically transmitting, by the transmitter of the computing device, the authentication data to the first access point using the first communication channel, wherein the authentication data is transmitted to the first access point prior to receiving the configuration data from the first access point.

2. The method of claim 1, wherein the first communication channel and the second communication channel use a different communication protocol from the area network.

3. The method of claim 1, further comprising:
   detecting, by the computing device, a plurality of access points including the first access point and the second access point;
   displaying, on a display device interfaced with the computing device, a list of the plurality of access points; and
   receiving, by an input device interfaced with the computing device, a selection of the first access point and a selection of the second access point.

4. The method of claim 1, further comprising:
   displaying, by a display device interfaced with the computing device, a list of configuration options; and
   receiving, by an input device interfaced with the computing device, a selection of one or more configuration options, wherein
   the configuration data received from the first access point includes configuration options corresponding to the received selection of one or more configuration options.

5. The method of claim 1, wherein the second access point is configured to join the area network using the transmitted configuration data and receive additional configuration data from the first access point using the area network.

6. A method for replication of an access point, comprising:
   establishing, by a computing device, a first communication channel with a first access point of an area network;
   receiving, by a receiver of the computing device, configuration data from the first access point using the first communication channel, wherein the configuration data includes at least a network identifier and password associated with the area network;
   establishing, by the computing device, a second communication channel with a second access point;
   electronically transmitting, by a transmitter of the computing device, the configuration data to the second access point using the second communication channel;
   receiving, by the receiver of the computing device, alternative configuration data from the second access point using the second communication channel, wherein the alternative configuration data includes at least a network identifier and password associated with a second network; and
   electronically transmitting, by the transmitter of the computing device, the alternative configuration data to the first access point using the first communication channel.

7. A system for replication of an access point, comprising:
   a transmitter of a computing device;
   a communications interface of the computing device configured to establish a first communication channel with a first access point of an area network;
   a receiver of the computing device configured to receive configuration data from the first access point using the first communication channel, wherein the configuration data includes at least a network identifier and password associated with the area network; and an input device interfaced with the computing device configured to receive authentication data including at least a username and an associated password;

wherein the communications interface of the computing device is further configured to establish a second communication channel with a second access point, the transmitter of the computing device is configured to electronically transmit the configuration data to the second access point using the second communication channel, the transmitter of the computing device is further configured to electronically transmit the authentication data to the first access point using the first communication channel, and the authentication data is transmitted to the first access point prior to receiving the configuration data from the first access point.

8. The system of claim 7, wherein the first communication channel and the second communication channel use a different communication protocol from the area network.

9. The system of claim 7, further comprising:
a detection module of the computing device configured to detect a plurality of access points including the first access point and the second access point;
a display device interfaced with the computing device configured to display a list of the plurality of access points; and
an input device interfaced with the computing device configured to display a selection of the first access point and a selection of the second access point.

10. The system of claim 7, further comprising:
a display device interfaced with the computing device configured to display a list of configuration options; and
an input device interfaced with the computing device configured to receive a selection of one or more configuration options, wherein
the configuration data received from the first access point includes configuration options corresponding to the received selection of one or more configuration options.

11. The system of claim 7, wherein the second access point is configured to join the area network using the transmitted configuration data and receive additional configuration data from the first access point using the area network.

12. A system for replication of an access point, comprising:
a transmitter of a computing device;
a communications interface of the computing device configured to establish a first communication channel with a first access point of an area network; and
a receiver of the computing device configured to receive configuration data from the first access point using the first communication channel, wherein the configuration data includes at least a network identifier and password associated with the area network;
wherein the communications interface of the computing device is further configured to establish a second communication channel with a second access point,
the transmitter of the computing device is configured to electronically transmit the configuration data to the second access point using the second communication channel,
the receiver of the computing device is further configured to receive alternative configuration data from the second access point using the second communication channel, wherein the alternative configuration data includes at least a network identifier and password associated with a second network, and
the transmitter of the computing device is further configured to electronically transmit the alternative configuration data to the first access point using the first communication channel.

13. A non-transitory computer readable media having instructions operable to cause one or more processors to perform operations comprising:
establishing, by a computing device, a first communication channel with a first access point of an area network;
receiving, by a receiver of the computing device, configuration data from the first access point using the first communication channel, wherein the configuration data includes at least a network identifier and password associated with the area network;
establishing, by the computing device, a second communication channel with a second access point;
electronically transmitting, by a transmitter of the computing device, the configuration data to the second access point using the second communication channel;
receiving, by the receiver of the computing device, alternative configuration data from the second access point using the second communication channel, wherein the alternative configuration data includes at least a network identifier and password associated with a second network; and
electronically transmitting, by the transmitter of the computing device, the alternative configuration data to the first access point using the first communication channel.

14. The non-transitory computer readable media of claim 13, wherein the first communication channel and the second communication channel use a different communication protocol from the area network.

15. The non-transitory computer readable media of claim 13, being further configured to perform the operations comprising:
detecting, by the computing device, a plurality of access points including the first access point and the second access point;
displaying, on a display device interfaced with the computing device, a list of the plurality of access points; and
receiving, by an input device interfaced with the computing device, a selection of the first access point and a selection of the second access point.

16. The non-transitory computer readable media of claim 13, being further configured to perform the operations comprising:
displaying, by a display device interfaced with the computing device, a list of configuration options; and
receiving, by an input device interfaced with the computing device, a selection of one or more configuration options, wherein
the configuration data received from the first access point includes configuration options corresponding to the received selection of one or more configuration options.

17. A non-transitory computer readable media having instructions operable to cause one or more processors to perform operations comprising:
establishing, by a computing device, a first communication channel with a first access point of an area network;

receiving, by a receiver of the computing device, configuration data from the first access point using the first communication channel, wherein the configuration data includes at least a network identifier and password associated with the area network;

establishing, by the computing device, a second communication channel with a second access point;

electronically transmitting, by a transmitter of the computing device, the configuration data to the second access point using the second communication channel;

receiving, by an input device interfaced with the computing device, authentication data including at least a username and an associated password; and electronically transmitting, by the transmitter of the computing device, the authentication data to the first access point using the first communication channel, wherein the authentication data is transmitted to the first access point prior to receiving the configuration data from the first access point.

\* \* \* \* \*